United States Patent
Iovene et al.

(10) Patent No.: US 9,191,293 B2
(45) Date of Patent: Nov. 17, 2015

(54) METHOD AND DEVICE FOR HANDLING OF CONNECTIONS BETWEEN A CLIENT AND A SERVER VIA A COMMUNICATION NETWORK

(75) Inventors: Massimo Iovene, Naples (IT); Carmine Galotto, Pagani (IT); Ana Orea Garcia, Madrid (ES)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 568 days.

(21) Appl. No.: 13/141,246

(22) PCT Filed: Dec. 22, 2008

(86) PCT No.: PCT/EP2008/068192
§ 371 (c)(1),
(2), (4) Date: Sep. 2, 2011

(87) PCT Pub. No.: WO2010/072252
PCT Pub. Date: Jul. 1, 2010

(65) Prior Publication Data
US 2011/0307546 A1    Dec. 15, 2011

(51) Int. Cl.
| H04L 12/26 | (2006.01) |
| H04L 12/701 | (2013.01) |
| H04L 12/707 | (2013.01) |
| H04L 12/703 | (2013.01) |
| H04L 29/08 | (2006.01) |
| H04L 29/14 | (2006.01) |
| H04L 29/06 | (2006.01) |

(52) U.S. Cl.
CPC ............ *H04L 43/0811* (2013.01); *H04L 45/00* (2013.01); *H04L 45/22* (2013.01); *H04L 45/28* (2013.01); *H04L 67/14* (2013.01); *H04L 69/40* (2013.01); *H04L 69/28* (2013.01)

(58) Field of Classification Search
USPC .......................................................... 709/203
See application file for complete search history.

(56) References Cited

U.S. PATENT DOCUMENTS

| 6,732,186 | B1 | 5/2004 | Hebert |
| 7,391,719 | B2 * | 6/2008 | Ellis et al. ................... 370/219 |
| 7,409,451 | B1 | 8/2008 | Meenan et al. |
| 2005/0138460 | A1 | 6/2005 | McCain |
| 2007/0159977 | A1 * | 7/2007 | Dalal et al. ................... 370/238 |

OTHER PUBLICATIONS

Anonymous, "Switching LDAP contexts for failover", Spring Community Forums, Aug. 30, 2007, pp. 1-2.
Symlabs Identity Management Infrastructure, "LDAP Proxy Solutions—Symlabs", Internet Article, Jul. 9, 2006, pp. 1-2.
(Continued)

*Primary Examiner* — Angela Nguyen
(74) *Attorney, Agent, or Firm* — Coats & Bennett, PLLC

(57) ABSTRACT

A method is described for handling of connections between a client (200) and a server (214) via a communication network. A connection (206) is established over a first access point (202) which is associated with the server (214). At least one further access point (204) associated with the server is defined. A failure of the connection (206) over the first access point (202) is detected and a second connection (208) between the client (200) and the server (214) is established over the further access point (204). A third connection (212) between the client (200) and the server (214) over the first access point (202) is further established. The establishment of the third connection (212) is executed with a delay compared to the establishment of the second connection (208).

17 Claims, 4 Drawing Sheets

(56) References Cited

OTHER PUBLICATIONS

Minnaar, M. et al., "Simulation of the SCTP Failover Mechanism", Southern African Telecommunication Networks and Applications Conference (SATNAC) 2003 Proceedings, Sep. 10, 2003, pp. 1-5.

Zeilenga, K, "Lightweight Directory Access Protocol (LDAP): Technical Specification Road Map", Network Working Group, Request for Comments: 4510, Jun. 2006, pp. 1-7, OpenLDAP Foundation, The Internet Society.

* cited by examiner

METHOD AND DEVICE FOR HANDLING OF CONNECTIONS BETWEEN A CLIENT AND A SERVER VIA A COMMUNICATION NETWORK

TECHNICAL FIELD

The present invention relates to a method for handling of connections between a client and a server via a communication network. A device embodying the invention is also described.

BACKGROUND

A directory is a set of objects organized in a logical and hierarchical manner. An example of a directory is a telephone directory, which consists of a series of names, e.g. of persons or organizations, organized alphabetically, with each name having an address and phone number attached. A directory can be regarded as a tree of entries also known as directory information tree, or simply directory tree, due to the fact that data is represented in a hierarchical tree-like structure. The data in a directory can be managed by directory services.

Modifications and queries in a directory can be made using application protocols e.g. the Lightweight Directory Access Protocol (LDAP). One or more servers may contain the data making up the directory. In case of a distributed directory, regardless of which server a client connects to, it has the same view of the directory; a name presented to a server refers to the same entry it would refer to on another server.

There is an increasing interest on applications, especially in telecommunications networks, which could benefit from the capabilities offered by a central database, hosted on a server. Towards this server more than one client may need to be connected over a communication network. In this case for each client-server pair a dedicated connection is established.

For capacity reasons as well as for geographical redundancy reasons, more than one connection may need to be established from one client towards a given server. The server can offer one or more access points in order to support multiple connections from one client. In this case there is a possibility that not all the access points offer the same capacity even though they belong to the same server. It may also happen that although the access points have equal capacity it may be desirable that a given client uses a specific access point.

If there is not a mechanism to control and handle the connections from a client to the access points, problems like inefficient usage of hardware resources or congestions may occur. For example, due to a temporary connectivity failure, clients may be directed to get connected to another access point which may be the same for all the clients. This access point may not have enough capacity to handle all connections and congestion may occur. Also if many clients try to reconnect to the same access point simultaneously it is probable that the communication network will get overloaded with protocol messages from the clients. It may also happen that, due to a big number of simultaneous connection attempts towards the same access point, all of them will fail if the access point becomes unavailable. On the other hand if the access point is available and all connections succeed, there may again be a message overload.

In the U.S. Pat. No. 6,484,206 B2 a solution is described where in case of failure of multiple connections, one of the failed connections is selected and for this connection repeated attempts are made so that the connection is re-established between the client and the server. After this connection is re-established, attempts for re-establishment of the rest of the failed connections are made. Each re-establishment attempt has to be successful before a further attempt is made. This solution does not allow an efficient usage of hardware and may lead to delays since the re-establishment of each failed connection depends on the success of the previous re-establishment attempt.

SUMMARY

It is an object of the present invention to obviate the above disadvantages and provide an advantageous method for handling of connections between a client and a server via a communication network.

The invention is embodied in a method, a device and a program as described in the independent claims. Further embodiments of the invention are described in the dependent claims.

A method for handling of connections between a client and a server via a communication network is proposed. A connection between a client and a server is established over a first access point which is associated with the server. At least one further access point, associated with the server, is defined. Further a failure of the connection over the first access point is detected. Following that a second connection between the client and the server over the further access point is established. Finally a third connection between the client and the server over the first access point is established. The establishment of the third connection is executed with a delay compared to the establishment of the second connection.

Furthermore, the invention can be embodied in a device for controlling a connection between a client and a server via a communication network. The device comprises a monitor which is adapted to monitor a status of the connection over the first access point. The device further comprises a processor which is adapted to specify at least one further access point associated with the server. The processor is also adapted to establish a second connection over the further access point and a third connection over the first access point. Finally the device comprises a timer which is adapted to control a delay for establishing the third connection.

The method can also be embodied in a program which is, for example, stored on a data carrier or loadable into a processing system of a mobile device, e.g. as a sequence of signals.

The proposed method and devices allow an advantageous handling of a connection between a client and a server via a communication network while avoiding inefficient hardware usage and delays.

The foregoing and other objects, features and advantages of the present invention will become more apparent in the following detailed description of preferred embodiments as illustrated in the accompanying drawings.

DETAILED DESCRIPTION

Figure 1:
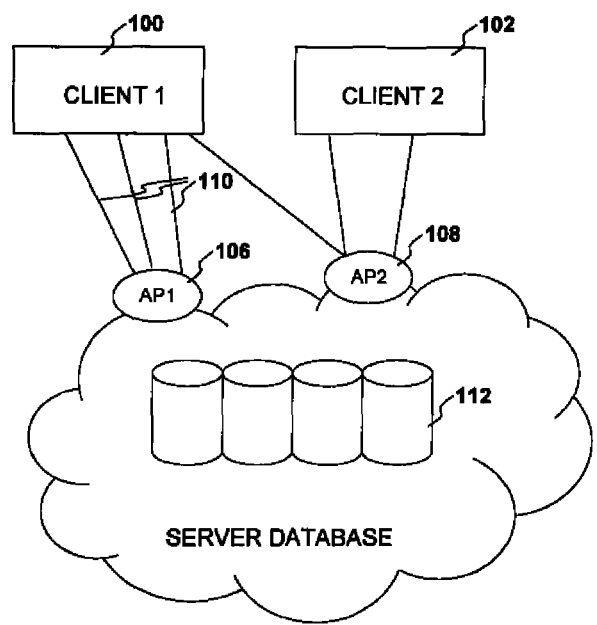
FIG. 1 shows two client nodes connected to a server database over two access points.

In FIG. 1 two clients 100, 102 connected to a server 112 over two access points 106, 108 are shown. The server 112 may be embodied as a server database comprising a plurality of server units. For simplicity reasons reference will be only made to the server although the following description equally applies for a server database. Multiple connections 110 exist between the clients 100, 102 and the server 112 over the two access points 106, 108. The connection architecture shown in FIG. 1 can include multiple clients and access points, which is often the case for complex real time data access applications. Multiple connections from each client towards the server may be simultaneously existing over one or more access points.

The clients 100, 102 of FIG. 1 can be, for example, telecom nodes which communicate with a server 112 through e.g. an LDAP service based protocol. The server 112 can comprise a directory which allows reading and writing of data. The access points 106, 108 are e.g. Internet Protocol (IP) addresses offered by the server 112 as points of contact for the clients 100, 102.

The client-server model shown in FIG. 1 can be generally used in the cases where one or more clients make service requests, e.g. for retrieving data allowing them to perform certain operations, towards one server or multiple server units forming a server database. It is therefore important that there are ways to ensure that the service requests of the clients are served by replies from the server and that even in the case of temporary loss of connectivity between a client and a server there can still be a way to efficiently recover the connection and serve the client's requests.

Figure 2:
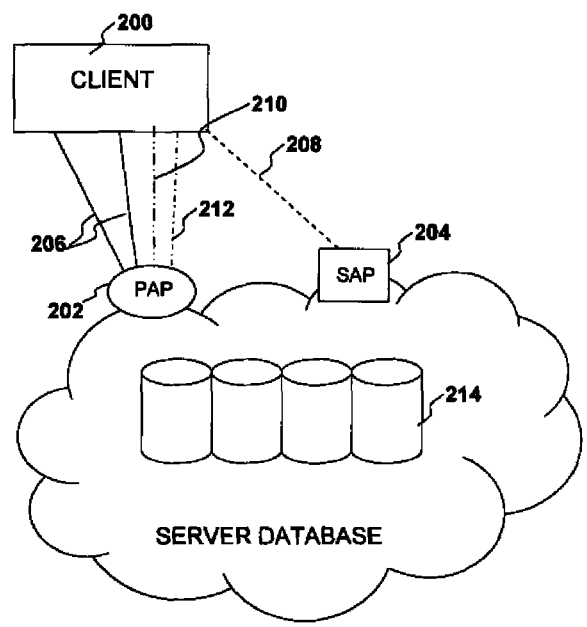
FIG. 2 shows an illustration of the proposed solution for handling connections between a client and a server.

FIG. 2 illustrates the proposed solution for handling connections between a client and a server and for acting accordingly depending on the status of the connection. In FIG. 2, one client 200 and three connections 206 between the client 200 and the server 214 are shown. On the side of the server 214 two access points 202, 204 are shown. The solution can be applied to multiple clients and client-server connections over multiple access points. The number of clients and connections shown in FIG. 2 is chosen for illustrative purposes.

A primary access point and one or more secondary access points can be used for connecting the client 200 to the server 214. In the example of FIG. 2 two different access points are shown, one can be a primary access point 202 and the other can be a secondary access point 204. The primary access point 202 is the preferred address which can be used from the client 200 to connect to the server 214. The preference towards the primary access point 202 can be due to the fact that, for example, this specific access point may offer higher capacity or it may be able to serve requests faster than other access points. The secondary access point 204 can be the backup IP address which can be used by the client 200 to connect to the server 214 in case the primary access point 202 is not available. The primary and secondary access points may be specific for each client and may differ for different clients, e.g. the primary access point 202 for client 200 may be the secondary access point for another client.

It is assumed that, initially, all three connections 206 from the client 200 to the server 214 over the primary access point 202 are functioning properly and service requests and responses are transferred between the client 200 and the server 214 over the primary access point 202. At a certain point one of the connections 206 is lost, for example connection 210, due to a temporary unavailability of the primary access point 202. The loss of the connection 210 is detected by the client 200. There can be an immediate attempt from the client 200 to re-establish connection 210 towards the server 214 over the primary access point 202. If connection 210 is re-established, the traffic i.e. service requests, between the client 200 and the server 214 can continue normally over the primary access point 202. If connection 210 over the primary access point 202 is not re-established e.g. because the primary access point 202 is still unavailable, the client 200 can make another attempt to connect to the server 214 but this time over the secondary access point 204. If the establishment of the connection 208 over the secondary access point 204 succeeds, traffic which was sent between the client 200 and the server 214 prior to the loss of the connection 210 over the primary access point 202 is transferred over the secondary access point 204.

It has been mentioned before that the primary access point 202 can be the preferred point over which the client 200 can access the server 214. For this reason, if the secondary access point 204 is being used, following a loss of a connection over the primary access point 202, the client 200 preferably makes attempts to reconnect to the primary access point 202.

A time interval may elapse from the moment that the secondary access point 204 starts being used until there is an attempt to reconnect via the primary access point 202. This time interval can be controlled by a timer and its duration may be dependent on the nature of the application which makes service requests towards the server 214. The timer can be initiated as soon as connection 208 over the secondary access point 204 is established. Upon expiration of the timer an attempt to connect to the primary access point 202 is executed.

If the problem which caused the loss of the initial connection 210 over the primary access point 202 is solved, then the attempt is successful and a connection 212 over the primary access point 202 is established. Connection 212 can either be considered as a new or "third" connection—with connections 210 and 208 being denoted as first and second connections respectively—or it can be considered as a re-establishment of connection 210. In this case there will be two concurrent connections, connection 212 over the primary access point 202 and connection 208 over the secondary access point 204. The traffic which was already ongoing over the secondary access point 204 is concluded after the service requests have been served by the server 214 i.e. corresponding responses are sent via connection 208 even after the establishment of connection 212. The connection 208 over the secondary access point 204 is then closed. On the other hand, as soon as the connection 212 over the primary access point 202 is established, new traffic initiated by the client 200 will be directed over the primary access point 202.

If the primary access point 202 is still unavailable then the attempt to connect to the primary access point 202 may fail. In this case the timer mentioned before can be again initiated after the failure and upon timer expiry another attempt will be made for establishing the connection 212 over the primary access point 202. In the meantime the connection 208 over the secondary access point 204 is kept established. The attempts to establish the connection 212 over the primary access point 202 are repeated until the establishment is successful.

In an embodiment, after the connection 212 over the primary access point is established after failure, a probing time can be set during which it can be controlled if the connection 212 is reliable i.e. if traffic can be reliably handled over the connection 212. The check can be performed by, for example, routing test traffic over the primary access point 202 for a probing time e.g. of a few seconds. In the meantime and until the connection 212 over the primary access point 202 is proven to be reliable, new traffic is routed through the connection 208 over the secondary access point 204. When the probing time is elapsed and the connection 212 over the primary access point 202 is considered reliable new traffic can be routed through it. If the connection 212 is not stable, service requests from the client 200 to the server 214 are still sent over connection 208. After all the requests and responses sent via the secondary access point 204 are concluded, the connection 208 over the secondary access point 204 can be closed.

In another embodiment, after the connection 212 over the primary access point 202 is re-established after failure, traffic can be immediately routed through the connection 212 over the primary access point 202. During a probing time the connection 208 over the secondary access point 204 can remain established until it is verified that the connection 212 over the primary access point 202 is reliably handling traffic. When the probing time is over, the connection 212 over the primary access point 202 is considered healthy and it can be the only one handling new traffic. Also in this case, after all the traffic handled through the secondary access point 204 is concluded, the connection 208 over the secondary access point 204 is closed.

The embodiments described above may offer the advantage that once the connection 212 over the primary access point 202 is re-established, traffic can be routed securely over it having verified that the connection 212 is stable and without having the danger of e.g. an immediate new failure.

In a further embodiment, a secondary access point 204 can be used as a "stand by". This means that a connection 208 towards the secondary access point 204 can be or remain established but not be used for handling traffic unless the connection 206 over the primary access point 202 is not functioning properly. This can allow shortening the time needed to route traffic over the secondary access point 204 in case the connection 206 over the primary access point 202 is lost. In this case, the delay before the re-establishment of the connection via the primary access point is preferably not measured from the establishment of connection 208 but from the detection of the failure or the start of sending requests via said connection 208.

Until now reference has been made to the case where a single connection 206 over a primary access point 202 fails and a way to efficiently recover it has been described. The description made above may also cover cases where multiple connections from a client 200 towards a server 214 over a primary access point 202 fail simultaneously. In this case, after the failure is detected, the failed connections are also re-established over the secondary access point 204. There can be more than one way to handle the failed connections after they are re-established over the secondary access point 204.

In a preferred embodiment, an attempt to reconnect to the server 214 over the primary access point 202 is made for a first of the failed connections already established over the secondary access point 204. The procedure is executed in the way described before for the case of a single connection failure. Only after the connection over the primary access point 202 is successfully re-established for the connection attempted, all the other connections are handled. An advantage of this embodiment is that only the first of the failed connections may experience disturbances in the case of an insisting connection failure.

In another embodiment, similarly to the previous embodiment, an attempt to reconnect to the server 214 over the primary access point 202 is made for one of the failed connections. In this case though, after the connection over the primary access point 202 is successfully re-established for the connection attempted, the procedure is repeated subsequently for one of the failed connections after each other. An advantage of this embodiment is that traffic load can be transferred from the secondary to the primary connection in a way which will not overload the server 214.

In a still further embodiment, each one of the failed connections is treated individually. In this case the procedure described before for handling a single connection failure is applied. Since the failed connections are already re-established over the secondary access point 204, the steps following the re-establishment over the secondary access point are executed for each failed connection. This embodiment allows a faster fallback to the primary access point for each one of the failed connections.

Figure 3:
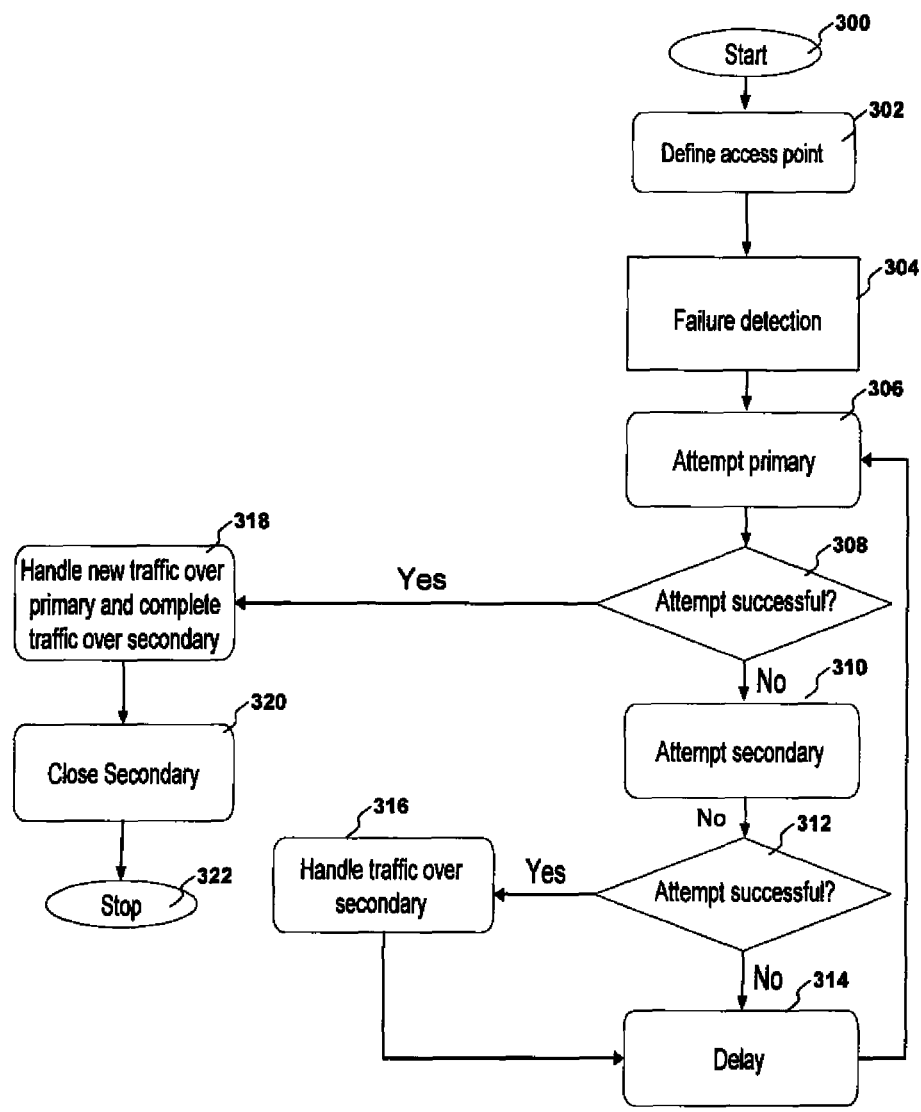
FIG. 3 shows a flow diagram of the proposed method.

FIG. 3 shows a flow diagram of the proposed method. The method starts in step 300 assuming that there is an ongoing connection between a client and a server over a primary access point. In step 302 a secondary access point, offered by the server, is obtained by the client and defined as a point over which traffic between the client and the server database can be routed. In step 304 a failure of the connection over the primary access point is detected from the client or e.g. a device monitoring the connection status. Following the detection, one attempt is made from the client, in step 306, to connect again to the server over the primary access point. In step 308 it is checked if the attempt is successful. If the attempt is not successful then there is a further attempt to connect to the server over the secondary access point, in step 310. Following that attempt another check is performed in step 312 in order to control if the attempt to connect over the secondary access point is successful. If it is successful then, in step 316, the traffic that was ongoing between the client and the server prior to the loss of the connection over the primary access point is transferred over the secondary access point. In step 314, a time delay is expired before making a new attempt in step 306 to connect again to the server over the primary access point. Alternatively, still further access points may be defined and attempted for connection before the process returns to step 306.

If the client's attempt to connect to the server over the secondary access point is not successful then, in step 314, a delay i.e. a time interval is elapsed before making a new attempt in step 306 to connect again to the server over the primary access point.

If the attempt of step 306 to establish a connection over the primary access point proves to be successful in step 308, then in step 318, new traffic generated from the client towards the server is handled over the primary access point. If a connection over the secondary access point has been previously established, e.g. in step 316, and is ongoing, then all traffic routed over the secondary access point is completed i.e. all outstanding responses to requests via the secondary access point are still sent over the secondary access point and the connection over the secondary access point is closed in step 320. In the end the connection over the primary access point is re-established and the method ends in step 322.

Figure 4:
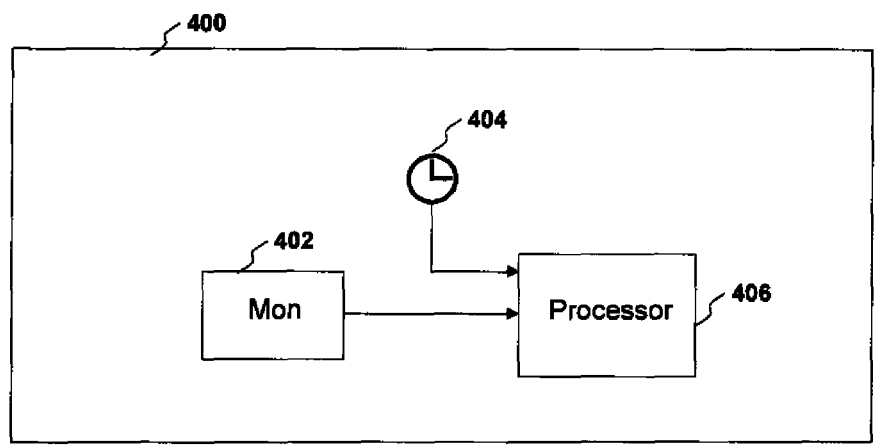
FIG. 4 shows a device which is adapted to perform the proposed method.

The invention can also be embodied in a device which can be adapted to perform any embodiments of the proposed method as described above. An embodiment of such a device is shown in FIG. 4. The device 400 comprises a monitor 402 adapted to monitor the status of the connection between the client and the server over the primary access point. The monitor can detect problems with the connection e.g. a failure of the connection due to a sudden unavailability of the primary access point.

The device 400 also comprises a processor 406 which is adapted to obtain a secondary access point offered by the server. There may be a plurality of access points offered by the server. The processor 406 can obtain one of them and define it as a secondary access point. The processor 406 is further adapted to establish a connection between the client and the server over the first and the second access point. The processor 406 is also adapted to receive an input from the monitor 402 indicating the status of the connection between the client and the server.

Further the device comprises a timer 404 which is adapted to control a delay for establishing the connection over the primary access point. The timer 404 is connected to the processor 406 and when the delay controlled by the timer 404 expires, the establishment of the connection between the client and the server over the primary access point is executed by the processor 406.

Such a device could, for example, be implemented in or next to a client, e.g. a router or a node in a telecommunication network.

The above embodiments admirably achieve the objects of the invention. However, it will be appreciated that departures can be made by those skilled in the art without departing from the scope of the invention which is limited only by the claims.

The invention claimed is:

1. A method for handling of connections between a client and a server via a communication network, wherein a first connection is established between the client and the server over a first access point associated with the server, wherein the first access point is a preferred access point, and wherein the method comprises:
    defining a second access point associated with the server;
    in response to detecting a failure of the first connection over the first access point, establishing a second connection between the client and the server over the second access point; and,
    after a delay relative to the establishment of the second connection, establishing a third connection between the client and the server over the first access point, the third connection being established independently of any status of the second connection;
    wherein the second connection between the client and the server is configured to transmit service requests from the client to the server;
    wherein the second connection between the client and the server is closed in response to both:
        the third connection being established; and
        receiving a service response via the second connection for each service request sent via the second connection.

2. The method according to claim 1, wherein at least one of the first and second access points is an internet protocol address of the server.

3. The method according to claim 1, wherein each of the first and third connections between the client and the server are configured to transmit service requests from the client to the server.

4. The method according to claim 1, further comprising verifying a stability of the third connection and keeping the second connection established until it is verified that the third connection is stable.

5. The method according to claim 1, further comprising, if a first attempt to establish the third connection fails, making a second attempt to establish the third connection at a time controlled by a timer.

6. The method according to claim 1, further comprising, after the third connection is established:
    detecting a failure of at least one further first connection between the client and the server over the first access point;
    establishing at least one further second connection between the client and the server over the second access point; and
    for at least one of the further first connections, establishing at least one further third connection between the client and the server over the first access point.

7. The method according to claim 3, wherein service requests sent after the establishment of the third connection are sent over the first access point.

8. The method according to claim 4, wherein service requests are sent over the third connection before the stability of the third connection is verified.

9. A device for controlling a first connection between a client and a server via a communication network, wherein the first connection is established over a first access point associated with the server, the first access point being a preferred access point, the device comprising:
    a monitor configured to monitor a status of the first connection over the first access point;
    a processor configured to:
        obtain at least one second access point associated with the server
        upon failure of the first connection over the first access point, establish a second connection between the client and the server over the second access point; and
        establish a third connection between the client and the server over the first access point, the third connection being established independently of any status of the second connection; and
    a timer configured to control a delay for establishing the third connection;
    wherein the second connection between the client and the server is configured to transmit service requests from the client to the server;
    wherein the second connection between the client and the server is closed in response to both:
        the third connection being established; and
        receiving a service response via the second connection for each service request sent via the second connection.

10. The device according to claim 9, wherein at least one of the first and second access points is an internet protocol address of the server.

11. The device according to claim 9, wherein each of the first and third connections between the client and the server are configured to transmit service requests from the client to the server.

12. The device according to claim 9, wherein the processor is configured to verify a stability of the third connection and to keep the second connection established until it is verified that the third connection is stable.

13. The device according to claim 9, wherein the processor is configured, if a first attempt to establish the third connection fails, to make a second attempt to establish the third connection at a time controlled by the timer.

14. The device according to claim 9, wherein, after the third connection is established, the monitor is configured to detect a failure of at least one further first connection between the client and the server over the first access point, and the processor is configured to:
    establish at least one further second connection between the client and the server over the second access point; and
    for at least one of the further first connections, establish at least one further third connection between the client and the server over the first access point.

15. The device according to claim 11, wherein service requests sent after the establishment of the third connection are sent over the first access point.

16. The device according to claim 12, wherein service requests are sent over the third connection before the stability of the third connection is verified.

17. A computer program product stored on a non-transitory computer readable medium and comprising computer program code that, when executed by a device, causes the device to handle connections between a client and a server via a communication network, wherein the computer program code causes the device to:
monitor a status of a first connection between the client and the server over a first access point, the first access point being a preferred access point;
obtain a second access point associated with the server;
in response to detecting a failure of the first connection over the first access point, initiate the establishment of a second connection between the client and the server over the second access point; and
after a delay relative to the establishment of the second connection, initiate the establishment of a third connection between the client and the server over the first access point, the third connection being established independently of any status of the second connection;
wherein the second connection between the client and the server is configured to transmit service requests from the client to the server;
wherein the second connection between the client and the server is closed in response to both:
the third connection being established; and
receiving a service response via the second connection for each service request sent via the second connection.

* * * * *